(12) United States Patent
Sakamoto et al.

(10) Patent No.: US 9,337,747 B2
(45) Date of Patent: May 10, 2016

(54) INVERTER APPARATUS AND INVERTER SYSTEM

(71) Applicant: KABUSHIKI KAISHA TOSHIBA, Minato-ku, Tokyo (JP)

(72) Inventors: Takafumi Sakamoto, Machida (JP); Yuji Tohzaka, Kawasaki (JP); Hiroyuki Kitagawa, Yokohama (JP); Hiroki Kudo, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 82 days.

(21) Appl. No.: 14/025,761

(22) Filed: Sep. 12, 2013

(65) Prior Publication Data
US 2014/0119080 A1   May 1, 2014

(30) Foreign Application Priority Data
Oct. 26, 2012 (JP) ................................. 2012-237077

(51) Int. Cl.
H02M 1/08 (2006.01)
H02M 7/493 (2007.01)

(52) U.S. Cl.
CPC ..................... *H02M 7/493* (2013.01)

(58) Field of Classification Search
CPC .............. H02J 3/36; H02J 3/38; H02J 3/40; H02J 3/44; H02J 2001/002; H02J 1/102; H02J 5/00; H02M 7/49; H02M 7/493; H02M 7/7575; H02M 7/81; H02M 1/36
USPC .......................................................... 363/95
See application file for complete search history.

(56) References Cited

U.S. PATENT DOCUMENTS

| | | | |
|---|---|---|---|
| 7,839,014 B2 | 11/2010 | Winter et al. | |
| 2011/0049990 A1* | 3/2011 | Amaratunga et al. | 307/45 |
| 2012/0187770 A1* | 7/2012 | Slota et al. | 307/87 |
| 2014/0046497 A1 | 2/2014 | Ueno et al. | |

FOREIGN PATENT DOCUMENTS

| | | |
|---|---|---|
| JP | 6-165515 A | 6/1994 |
| JP | 10201105 A | 7/1998 |
| JP | 2009521195 A | 5/2009 |

OTHER PUBLICATIONS

Masao Tanaka, et al. "FRENIC-VG, a High-Performance Vector-Control Inverter", 2012 vol. 85, No. 3, pp. 199-205 (with English Abstract thereof).
Related U.S. Appl. No. 13/960,030; First Named Inventor: Takeshi Ueno; Title: "Controller, Power Supply Unit, and Power Supply System"; filed: Aug. 6, 2013.
Acharya, et al., "Communication Fault-tolerant Wireless Network Control of a Load-sharing Mulitphase Interactive Power Network", IEEE Power Electronics Specialists Conference, 2006.
Marwali, et al., "Control of Distributed Generation Systems—Part II: Load Sharing Control", IEEE Transactions on Power Electronics, vol. 19, No. 6, Nov. 2004, pp. 1551-1561.
Zhang, et al., "Theoretical and Experimental Investigation of Networked Control for Parallel Operation of Inverters", IEEE Transactions on Industrial Electronics, vol. 59, No. 4, Apr. 2012, pp. 1961-1970.

* cited by examiner

*Primary Examiner* — Timothy J Dole
*Assistant Examiner* — Htet Z Kyaw
(74) *Attorney, Agent, or Firm* — Holtz, Holtz & Volek PC (57) ABSTRACT

According to one embodiment, an inverter apparatus includes a power conversion unit, a wireless communication unit and a control unit. The power conversion unit converts input power that is one of DC power and AC power into AC output power. The wireless communication unit wirelessly receives a first synchronization signal. The control unit controls a phase of the output power based on the first synchronization signal.

13 Claims, 5 Drawing Sheets

F I G. 12 ies to a toad or a system not shown in the drawings.
INVERTER APPARATUS AND INVERTER SYSTEM

CROSS-REFERENCE TO RELATED APPLICATIONS

This application is based upon and claims the benefit of priority from Japanese Patent Application No. 2012-237077, filed Oct. 26, 2012, the entire contents of which are incorporated herein by reference.

FIELD

Embodiments described herein relate generally to an inverter.

BACKGROUND

Inverters are conventionally utilized for power supply circuits in various electric devices. An inverter converts DC or AC input power into AC output power. The amount of output power required for the inverter varies depending on the application of the inverter. In general, the desired amount of output power can be achieved by a single inverter apparatus, but the inverter apparatus needs to be individually designed for each application.

In contrast, the desired amount of output power can be achieved using an inverter system including a plurality of inverter apparatuses connected together in parallel. Here, output power from the inverter system is generated by synthesizing (superposing) output power from the plurality of inverter apparatuses. Hence, if the phases of the output power from the inverter apparatuses are synchronized and the inverter apparatuses have normalized output power characteristics, then the amount of output power from the inverter system is equal to the (unit amount of output power from the inverter apparatus)×the (total number of inverter apparatuses). Such an inverter system can be easily adapted for any of various applications simply by adjusting the total number of inverter apparatuses.

As described above, the output power from the inverter system is generated by superposition of the output power from the inverter apparatuses. Hence, a loss in the output power from the inverter system increases depending on a shift in the phase of the output power among the inverter apparatuses.

DETAILED DESCRIPTION

Embodiments of the present invention will be described below with reference to the drawings.

In general, according to one embodiment, an inverter apparatus includes a power conversion unit, a wireless communication unit and a control unit. The power conversion unit converts input power that is one of DC power and AC power into AC output power. The wireless communication unit wirelessly receives a first synchronization signal. The control unit controls a phase of the output power based on the first synchronization signal.

Elements that are the same as or similar to described elements are hereinafter denoted by the same or similar reference numerals, with duplicate descriptions basically omitted.

First Embodiment

Figure 1:
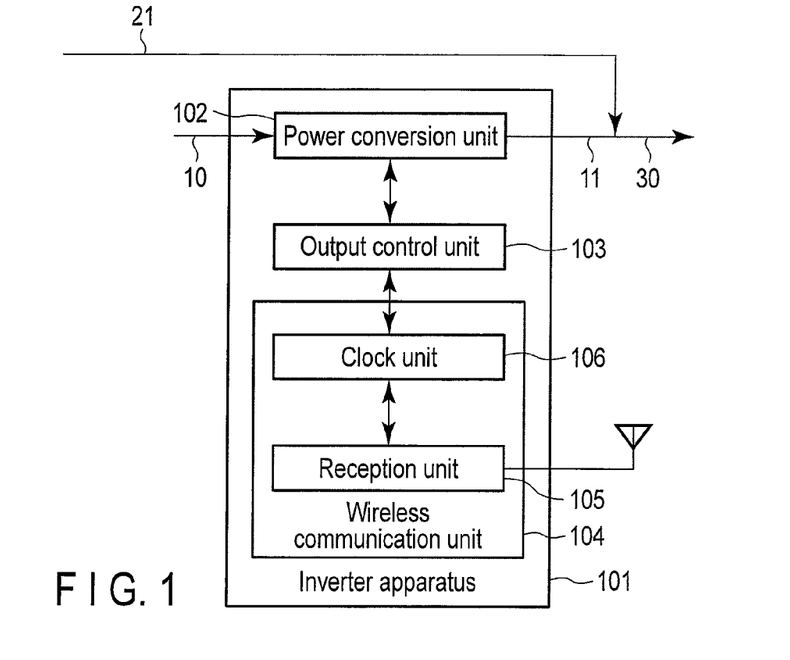
FIG. 1 is a diagram illustrating an inverter apparatus according to a first embodiment.

As illustrated in FIG. 1, an inverter apparatus 101 according to a first embodiment comprises a power conversion unit 102, an output control unit 103, and a wireless communication unit 104. The inverter apparatus 101 in FIG. 1 converts DC or AC input power 10 into AC output power 11. The inverter apparatus 101 in FIG. 1 is connected in parallel with another inverter apparatus not shown in the drawings to form an inverter system. The output power 11 is superposed on output power 21 from the other inverter apparatus to generate output power 30 from the inverter system. The output power 30 is supplied to a load or a system not shown in the drawings.

The power conversion unit 102 acquires the DC or AC input power 10. The power conversion unit 102 converts the input power 10 into the AC output power 11. The power conversion unit 102 supplies the output power 11 to the exterior of the inverter apparatus 101. As described below, the phase of the output power 11 is controlled by a phase correction signal from the output control unit 103.

The wireless communication unit 104 comprises at least a function to receive a wireless signal containing a synchronization signal described below. In the example illustrated in FIG. 1, the wireless communication unit 104 comprises a reception unit 105 and a clock unit 106.

The reception unit 105 receives, for example, the synchronization signal. The synchronization signal typically contains time information. Specifically, the time information is indicative of a time measured by an external apparatus or system. For example, the time may be measured by an atomic clock provided in a Global Positioning System (GPS) satellite or transmitter station for a standard wave or by a clock unit provided in the other inverter apparatus connected in parallel with the inverter apparatus 101. The reception unit 105 generates a time correction signal based on the time information contained in the synchronization signal, and outputs the time correction signal to the clock unit 106.

The clock unit 106 performs a clocking operation. That is, the clock unit 106 obtains a measured time. The clock unit 106 outputs time information indicative of the measured time to the output control unit 103 as necessary. Furthermore, the clock unit 106 may correct the measured time based on the time correction signal from the reception unit 105. For example, the clock unit 106 may match the measured time with a time indicated by the time correction signal conditionally or unconditionally. The time information may be a timestamp or another type of time information.

For synchronization of the timestamp, various techniques have been established in the field of wireless local area networks (LANs). For example, a mechanism is known in which an access point (AP) uses a beacon signal to notify a station (STA) of the timestamp of the AP. The appropriate utilization of such a technique enables accurate synchronization.

The clock unit 106 may output the time information at every given period or in response to correction of the measured time or request from the output control unit 103. For example, the output control unit 103 may monitor the efficiency of the output power 30 and request the time information from the clock unit 106 when the efficiency decreases (that is, a phase error increases).

The output control unit 103 inputs the time information from the clock unit 106 as necessary. The output control unit 103 generates a phase correction signal based on the time information and outputs the phase correction signal to the power conversion unit 102.

Specifically, the output control unit 103 may generate a phase correction signal for setting the phase of the output power 11 to a predetermined value (for example, zero) at every given period (for example, every one second). For example, the output control unit 103 may generate a phase correction signal for setting the phase of the output power 11 to a predetermined value (for example, zero) every time a less-than-one-second part of a measured time indicated by the time information matches a predetermined value (for example, zero). Such a phase correction signal is generated at a period of one second. Thus, as long as the frequency of the output power 11 is an integer, the phase of the output power 11 can be appropriately controlled regardless of the value of the frequency.

Alternatively, the output control unit 103 may derive a reference phase from the time information. For example, if the time information is a timestamp, the reference phase can be derived by:

$$\text{reference phase} = \frac{\text{MOD(timestamp, period of output power)}}{\text{period of output power}} \times 2\pi + \theta \quad (1)$$

In Expression (1), a function that calculates the remainder of A modulo B is denoted by MOD (A, B), and an initial phase is denoted by $\theta$ (for example, zero). For example, if the output power 11 has a frequency of 50 Hz (that is, the output power 11 has a period of 20,000 μs), the timestamp is 30,000 μs, and $\theta$ is zero, then the reference phase can be derived as $\pi$.

Every time the reference phase is derived, the output control unit 103 may generate a phase correction signal for matching the phase of the output power 11 with the reference phase. Alternatively, every time the reference phase matches a predetermined value (for example, zero), the output control unit 103 may generate a phase correction signal for matching the phase of the output power 11 with the predetermined value.

Figure 7:
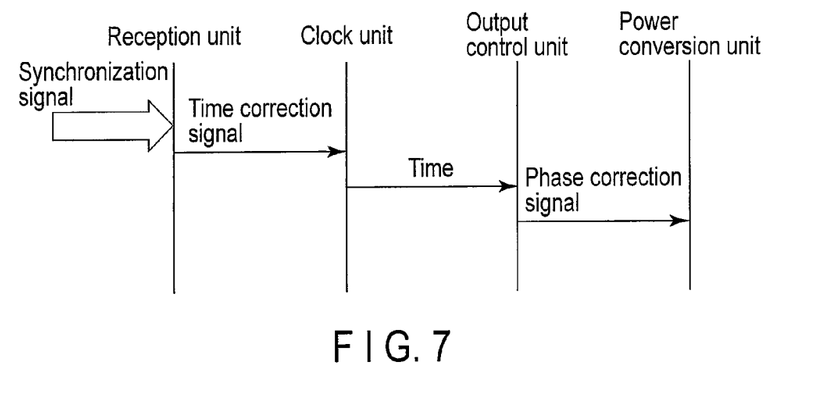
FIG. 7 is a diagram illustrating operation of the inverter apparatus according to the first embodiment.

The inverter apparatus 101 operates as illustrated in FIG. 7. The reception unit 105 wirelessly receives a synchronization signal containing the time information from an external apparatus or system. The reception unit 105 generates a time correction signal based on the time information contained in the synchronization signal, and outputs the time correction signal to the clock unit 106.

The clock unit 106 corrects the measured time based on the time correction signal. Furthermore, the clock unit 106 outputs the time information indicative of the measured time to the output control unit 103. The output control unit 103 generates a phase correction signal based on the time information, and outputs the phase correction signal to the power conversion unit 102.

The synchronization signal need not necessarily contain the time information. Specifically, if the synchronization signal is repeatedly transmitted at known transmission intervals (for example, at known periods) by an external apparatus or system, the known transmission interval may be utilized for phase synchronization, eliminating the need to contain the time information in the synchronization signal. In this case, the reception unit 105 may notify the output control unit 103 that the synchronization signal has been received. The output control unit 103 can derive the amount of change in the current reference phase with respect to the last reference phase by using the remainder of the known transmission interval modulo the period of the output power 11. Thus, the output control unit 103 can derive the current reference phase based on the known transmission interval and the last reference phase and generate a phase correction signal for matching the phase of the output power 11 with the current reference phase.

For example, if the output power has a frequency of 50 Hz (for example, the output power 11 has a period of 20 ms) and the synchronization signal is transmitted every 20 ms by the external apparatus or system, the amount of change in the current reference phase with respect to the last reference phase is fixed to zero. Thus, every time the output control unit 103 is notified that the synchronization signal has been received, the output control unit 103 may generate a phase correction signal for matching the phase of the output power 11 with a predetermined value (for example, zero). The transmission interval of the synchronization signal need not match the period of the output power 11. Even if the transmission interval of the synchronization signal is an integral multiple of the period of the output power 11 (for example, even if the transmission interval is one second), the output control unit 103 may generate a phase correction signal for matching the phase of the output power 11 with the predetermined value (for example, zero) every time the output control unit 103 is notified that the synchronization signal has been received.

Figure 4:
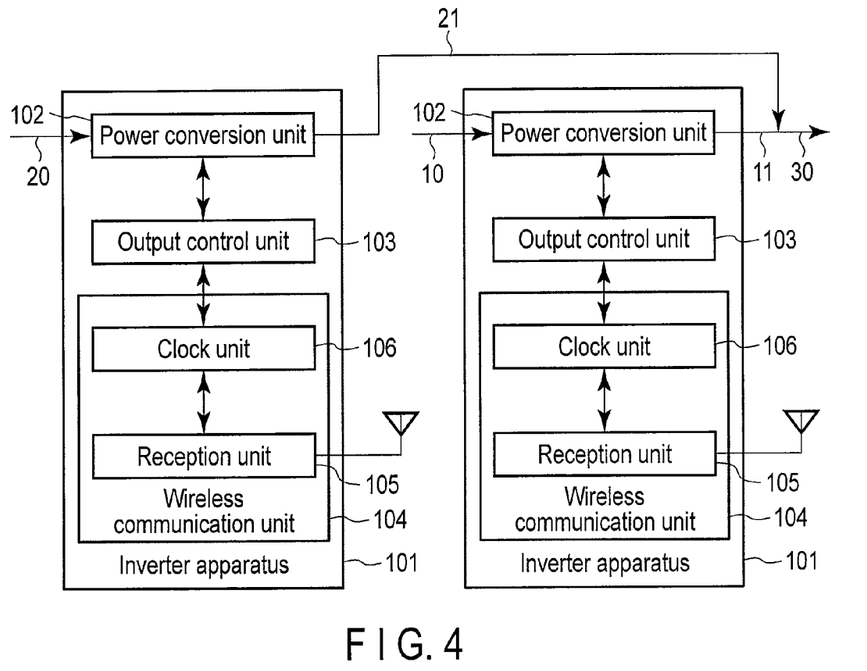
FIG. 4 is a diagram illustrating an inverter system including a plurality of the inverter apparatuses according to the first embodiment.

As illustrated in FIG. 4, an inverter system can be formed by connecting a plurality of inverter apparatuses 101 together in parallel. The inverter system in FIG. 4 may further comprise another inverter apparatus not shown in the drawings. In FIG. 4, an inverter apparatus 101 generates output power 11 based on the input power 10, whereas another inverter apparatus 101 generates output power 21 based on the input power 20. The output power 11 and the output power 21 are superposed on each other to generate output power 30 from the inverter system in FIG. 4. Here, both inverter apparatuses 101 corrects the phases of the output power 11 and the output power 21, respectively, based on the common synchronization signal. Thus, the phase of the output power 11 and the phase of the output power 21 substantially match. Consequently, a possible power loss is suppressed when the output power 11 and the output power 21 are superposed on each other.

As described above, the inverter apparatus according to the first embodiment wirelessly receives the synchronization signal, and corrects the phase of the output power based on the time information contained in the synchronization signal or the known transmission interval of the synchronization signal. Thus, according to the inverter, when the inverter system is formed, the phases of output power from the inverter apparatuses are synchronized. Therefore, a possible loss in the output power from the inverter system is suppressed.

Second Embodiment

Figure 2:
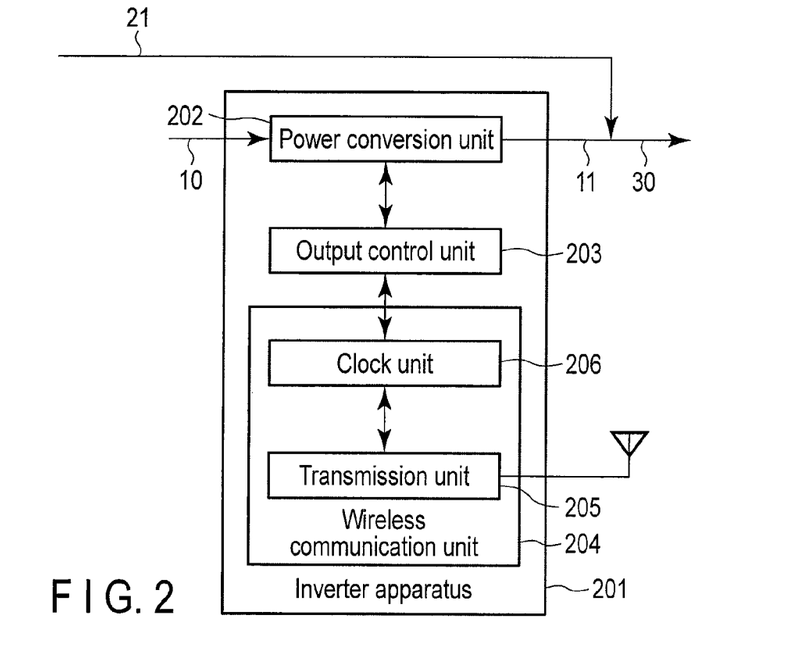
FIG. 2 is a diagram illustrating an inverter apparatus according to a second embodiment.

As illustrated in FIG. 2, an inverter apparatus 201 according to a second embodiment comprises a power conversion unit 202, an output control unit 203, and a wireless communication unit 204. The inverter apparatus 201 in FIG. 2 converts DC or AC input power 10 into AC output power 11. The inverter apparatus 201 in FIG. 2 is connected in parallel with another inverter apparatus not shown in the drawings to form an inverter system. The output power 11 is superposed on output power 21 from the other inverter apparatus to generate output power 30 from the inverter system. The output power 30 is supplied to a load or a system not shown in the drawings.

The power conversion unit 202 acquires the DC or AC input power 10. The power conversion unit 202 converts the input power 10 into the AC output power 11. The power conversion unit 202 supplies the output power 11 to the exterior of the inverter apparatus 201. As described below, the phase of the output power 11 is controlled by a phase correction signal from the output control unit 203.

The wireless communication unit 204 comprises at least a function to transmit a wireless signal containing a synchronization signal described below. In the example illustrated in FIG. 2, the wireless communication unit 204 comprises a transmission unit 205 and a clock unit 206.

The transmission unit 205 transmits, for example, the synchronization signal. The synchronization signal typically contains time information. Specifically, the time information is indicative of a time measured by the clock unit 206. The transmission unit 205 inputs the time information including the measured time from the clock unit 206 as necessary, generates a synchronization signal based on the time information, and transmits the synchronization signal to another inverter apparatus not shown in the drawings. Instead of transmitting the synchronization signal containing the time information, the transmission unit 205 may repeatedly transmit the synchronization signal to the other inverter apparatus at known transmission intervals. Here, the transmission unit 205 may adjust the transmission interval of the synchronization signal with reference to the measured time from the clock unit 206.

The clock unit 206 performs a clocking operation. That is, the clock unit 206 obtains a measured time. The clock unit 206 outputs time information indicative of the measured time to the output control unit 203 or the transmission unit 205 as necessary. The time information may be a timestamp or another type of time information. The clock unit 206 may output the time information at every given period or in response to a request from the output control unit 203 or transmission unit 205. For example, the output control unit 203 may monitor the efficiency of the output power 30 and request the time information from the clock unit 206 when the efficiency decreases (that is, a phase error increases).

The output control unit 203 inputs the time information from the clock unit 206 as necessary. The output control unit 203 generates a phase correction signal based on the time information and outputs the phase correction signal to the power conversion unit 202. The output control unit 203 may carry out processing that is the same as or similar to the processing carried out by the output control unit 103. In addition to this processing, the output control unit 203 may carry out processing for delay compensation described below.

Figure 8:
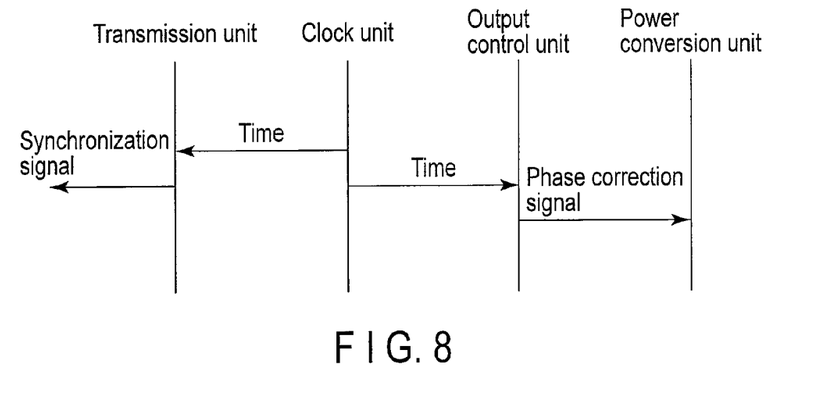
FIG. 8 is a diagram illustrating operation of the inverter apparatus according to the second embodiment.

The inverter apparatus 201 operates as illustrated in FIG. 8. The clock unit 206 outputs the time information indicative of the measured time to the output control unit 203 or the transmission unit 205 as necessary.

Upon inputting the time information, the transmission unit 205 generates a synchronization signal based on the time information and transmits the synchronization signal to the other inverter apparatus not shown in the drawings. On the other hand, the output control unit 203 generates a phase correction signal based on the time information and outputs the phase correction signal to the power conversion unit 202.

Figure 5:
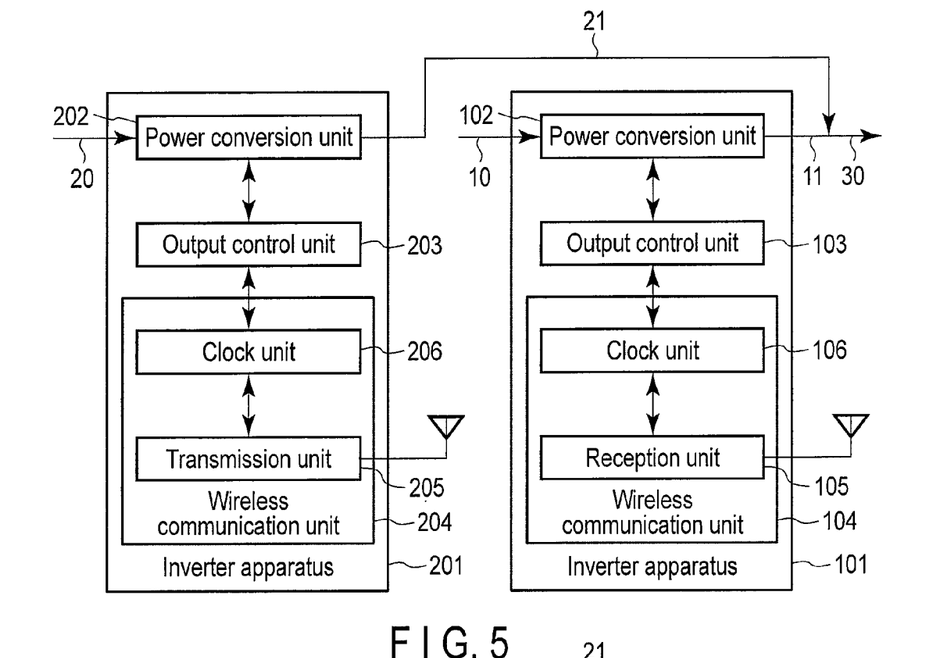
FIG. 5 is a diagram illustrating an inverter system including the inverter apparatus according to the first embodiment and the inverter apparatus according to the second embodiment.

As illustrated in FIG. 5, an inverter system can be formed by connecting the inverter apparatus 201 with the inverter apparatus 101 according to the first embodiment. The inverter system in FIG. 5 may further comprise another inverter apparatus not shown in the drawings. In FIG. 5, the inverter apparatus 101 generates output power 11 based on the input power 10, whereas the inverter apparatus 201 generates output power 21 based on the input power 20. The output power 11 and the output power 21 are superposed on each other to generate output power 30 from the inverter system in FIG. 5. Here, the inverter apparatuses 201 correct the phases of the output power 21 based on the measured time from the clock unit 206. On the other hand, the inverter apparatus 101 corrects the phase of the output power 11 based on a synchronization signal containing information indicative of the measured time from the clock unit 206. Hence, the phase of the output power 11 and the phase of the output power 21 substantially match. Consequently, a possible power loss is suppressed when the output power 11 and the output power 21 are superposed on each other.

The inverter system including the inverter apparatus 201 according to the present embodiment may carry out processing for delay compensation. Specifically, the phase of the output power from the inverter apparatus in the inverter system other than the inverter apparatus 201, that is, the other inverter apparatus, is corrected based on the measured time contained in the synchronization signal wirelessly transmitted by the inverter apparatus 201. That is, the measured time that can be referenced by the other inverter apparatus through the synchronization signal does not strictly match the time measured by the clock unit 206 at the point of time of the reference but is equal to the latter measured time minus the amount of delay involved in the transmission and reception of the synchronization signal. On the other hand, the phase of the output power from the inverter apparatus 201 is immediately corrected based on the measured time from the clock unit 206. Thus, even if the other inverter apparatus appropriately corrects time, the measured time varies between the inverter apparatus 201 and the other inverter apparatus. As a result, the phase of the output power from the other inverter apparatus lags the phase of the output power from the inverter apparatus 201.

Figure 9:
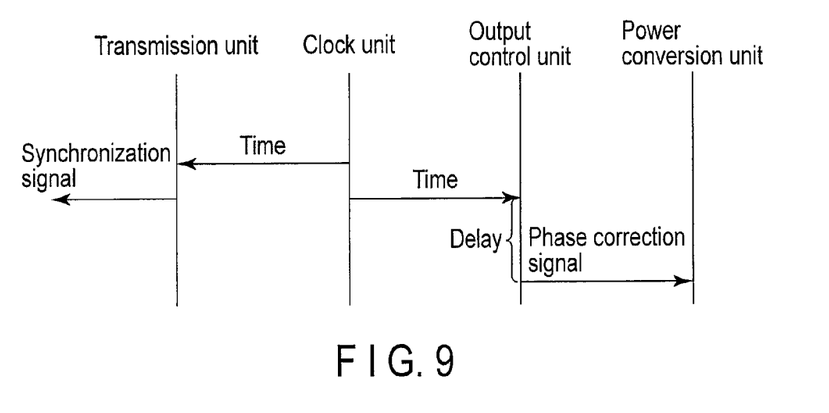
FIG. 9 is a diagram illustrating operation of the inverter apparatus according to the second embodiment.

Thus, as illustrated in FIG. 9, the output control unit 203 may generate a phase correction signal using a time obtained by subtracting an offset from the measured time indicated by the time information or using a phase obtained by subtracting an offset from a derived reference phase. The delay compensation process enables the phase of the output power from the inverter apparatus 201 to be retarded so as to be closer to the phase of the output power from the other inverter apparatus.

Figure 10:
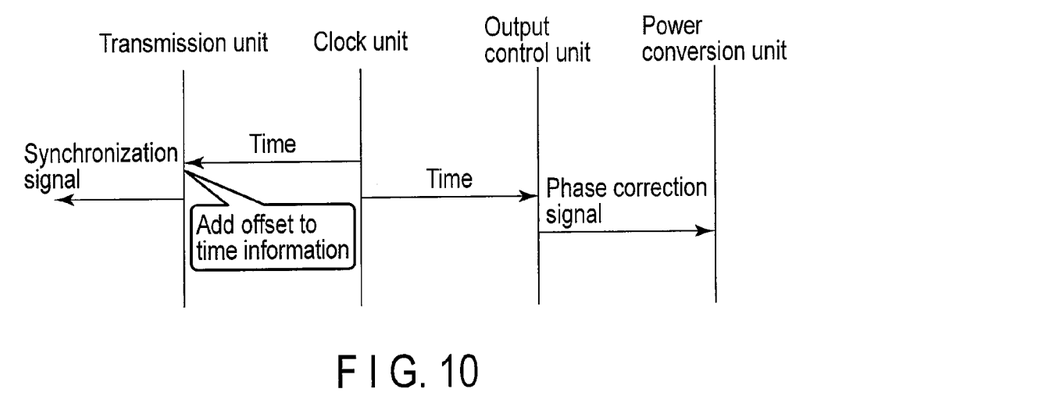
FIG. 10 is a diagram illustrating operation of the inverter apparatus according to the second embodiment.

Alternatively, as illustrated in FIG. 10, the transmission unit 205 may generate a synchronization signal using a time obtained by adding an offset to the measured time indicated by the time information. Such a delay compensation process enables the phase of the output power from the other inverter apparatus to be advanced so as to be closer to the phase of the output power from the inverter apparatus 201.

Figure 11:
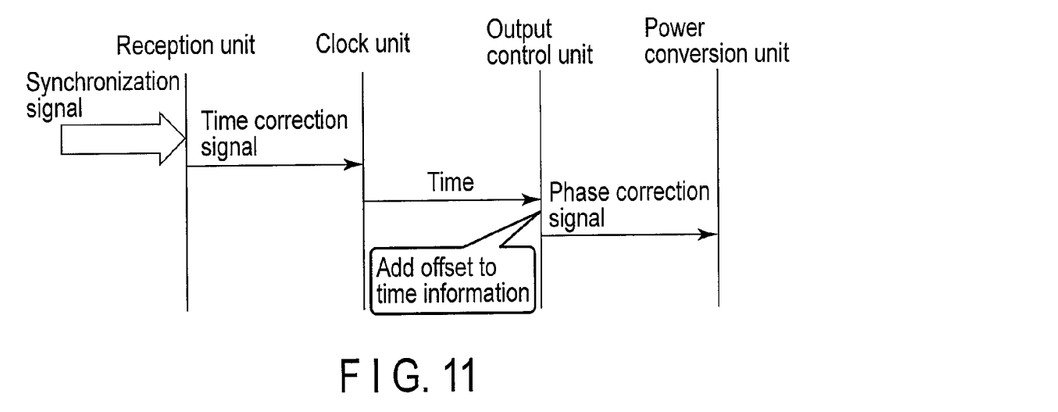
FIG. 11 is a diagram illustrating operation of the inverter apparatus according to the first embodiment.
Figure 12:
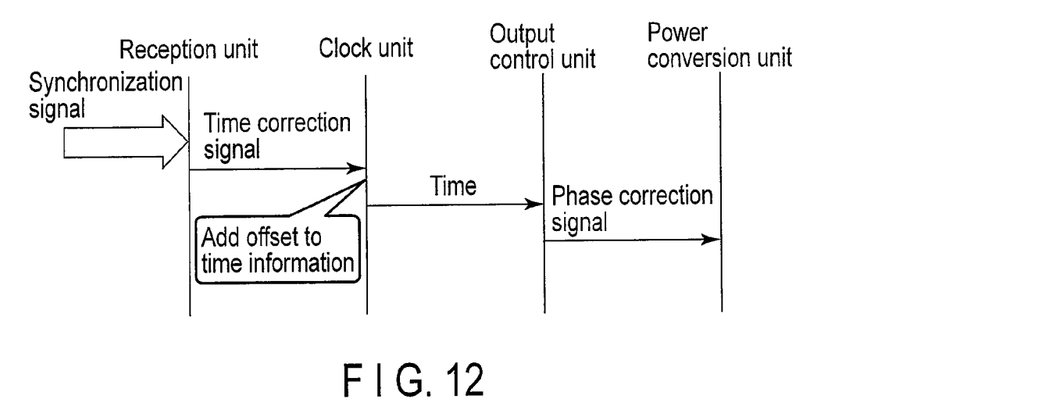
FIG. 12 is a diagram illustrating operation of the inverter apparatus according to the first embodiment.

The delay compensation process may be carried out not only by the inverter apparatus 201 but also by the other inverter apparatus (for example, the inverter apparatus 101 according to the first embodiment). As illustrated in FIG. 11, the output control unit 103 may generate a phase correction signal using a time obtained by adding an offset to the measured time indicated by the time information or using a phase obtained by adding an offset to the derived reference phase. Alternatively, as illustrated in FIG. 12, the clock unit 106 may correct the measured time based on a time obtained by adding an offset to the time indicated by a time correction signal received from the reception unit 105. More specifically, if the time correction signal contains a timestamp, the clock unit 106 may correct the measured time based on a timestamp obtained by adding an offset to the timestamp contained in the time correction signal. Such a delay compensation process enables the phase of the output power from the other inverter apparatus to be advanced so as to be closer to the phase of the output power from the inverter apparatus 201.

Alternatively, the reception unit 105 may generate a time correction signal using a time obtained by adding an offset to the measured time indicated by the time information contained in the synchronization signal. Such a delay compensation process enables the phase of the output power from the other inverter apparatus to be advanced so as to be closer to the phase of the output power from the inverter apparatus 201.

In any case, the offset is preferably set taking into account the amount of delay involved in the transmission and reception of the synchronization signal. The amount of delay may vary depending on various factors, for example, the usage environment of the inverter system. However, if the amount of delay is stable, a process for optimizing the offset is effective. The optimization of the offset can be achieved by, for example, such feedback control as optimizes the efficiency of the output power from the inverter system.

As described above, the inverter apparatus according to the second embodiment wirelessly transmits the synchronization signal based on the measured time from the clock unit, to another inverter apparatus. The synchronization signal is used for phase correction by the other inverter apparatus. Thus, according to the inverter apparatus of the present embodiment, the phases of the output power from the inverter apparatuses are synchronized when the inverter system is formed. This suppresses a possible loss in the output power from the inverter system.

Third Embodiment

Figure 3:
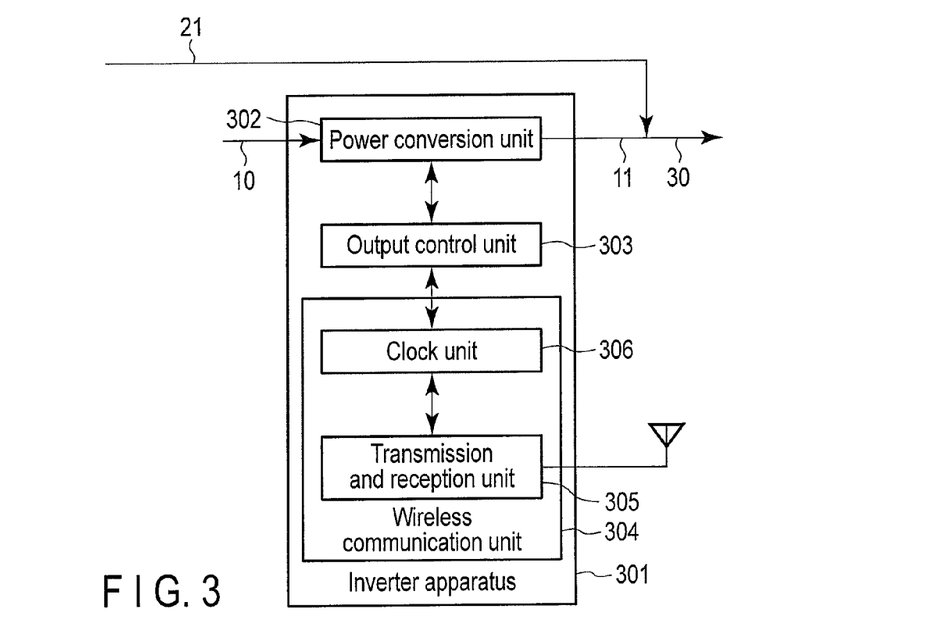
FIG. 3 is a diagram illustrating an inverter apparatus according to a third embodiment.

As illustrated in FIG. 3, an inverter apparatus 301 according to a third embodiment comprises a power conversion unit 302, an output control unit 303, and a wireless communication unit 304. The inverter apparatus 301 in FIG. 3 converts DC or AC input power 10 into AC output power 11. The inverter apparatus 301 in FIG. 3 is connected in parallel with another inverter apparatus not shown in the drawings to form an inverter system. The output power 11 is superposed on output power 21 from the other inverter apparatus to generate output power 30 from the inverter system. The output power 30 is supplied to a load or a system not shown in the drawings.

The power conversion unit 302 acquires the DC or AC input power 10. The power conversion unit 302 converts the input power 10 into the AC output power 11. The power conversion unit 302 supplies the output power 11 to the exterior of the inverter apparatus 301. As described below, the phase of the output power 11 is controlled by a phase correction signal from the output control unit 303.

The wireless communication unit 304 comprises at least a function to transmit and receive a wireless signal containing a synchronization signal described below. In the example illustrated in FIG. 3, the wireless communication unit 304 comprises a transmission and reception unit 305 and a clock unit 306. The transmission and reception unit 305 may comprise, for example, a packet transmission and reception function specified in the IEEE 1588 standard or a packet transmission and reception function in an Independent Basic Service Set (IBSS) mode specified in IEEE 802.11 wireless LAN standard.

The transmission and reception unit 305 transmits, for example, a synchronization signal (which is, in the present embodiment, referred to as a second synchronization signal for convenience). Typically, the second synchronization signal contains time information. Specifically, the time information is indicative of the time measured by the clock unit 306. The transmission and reception unit 305 inputs the time information including the measured time from the clock unit 306 as necessary, generates a second synchronization signal based on the time information, and transmits the second synchronization signal to another inverter apparatus not shown in the drawings. Instead of transmitting the second synchronization signal containing the time information, the transmission and reception unit 305 may repeatedly transmit the second synchronization signal to the other inverter apparatus at known transmission intervals. Here, the transmission and reception unit 305 may adjust the transmission interval of the second synchronization signal with reference to the measured time from the clock unit 306.

Furthermore, the transmission and reception unit 305 can receive a synchronization signal (which is, in the present embodiment, referred to as a first synchronization signal for convenience) transmitted by the other inverter apparatus. Typically, the first synchronization signal also contains time information. However, specifically, the time information is indicative of a time measured by a clock unit of the other inverter apparatus. The transmission and reception unit 305 generates a time correction signal based on the time information contained in the first synchronization signal and outputs the time correction signal to the clock unit 306.

The clock unit 306 performs a clocking operation. That is, the clock unit 306 obtains a measured time. The clock unit 306 outputs time information indicative of the measured time to the output control unit 303 or the transmission and reception unit 305 as necessary. Furthermore, the clock unit 306 may correct the measured time based on the time correction signal from the transmission and reception unit 305. The time information may be a timestamp or another type of time information.

The clock unit 306 may carry out the time correction in accordance with any of various algorithms. However, when an inverter system is formed, a plurality of inverter apparatuses needs to carry out the time correction in accordance with a common algorithm.

For example, if the measured time leads the time indicated by the time correction signal, the clock unit 306 may match the measured time with the time indicated by the time correction signal. Such time correction allows the slowest one of the clock units of the plurality of inverter apparatuses to be synchronized with the other clock units. In contrast, if the measured time lags the time indicated by the time correction signal, the clock unit 306 may match the measured time with the time indicated by the time correction signal. Such time correction allows the fastest one of the clock units of the plurality of inverter apparatuses to be synchronized with the other clock units. Alternatively, the clock unit 306 may match the measured time with the average value of the measured time and times indicated by one or more time correction signals input within a predetermined time.

The clock unit 306 may output the time information at every given period or in response to correction of the measured time or request from the output control unit 303. For example, the output control unit 303 may monitor the efficiency of the output power 30 and request the time information from the clock unit 306 when the efficiency decreases (that is, the phase error increases).

The output control unit 303 receives the time information from the clock unit 306 as necessary. The output control unit 303 generates a phase correction signal based on the time information and outputs the phase correction signal to the power conversion unit 302. The output control unit 303 may carry out processing that is the same as or similar to the processing carried out by the output control unit 103. In addition to this processing, the output control unit 303 may carry out processing for the above-described delay compensation.

Figure 6:
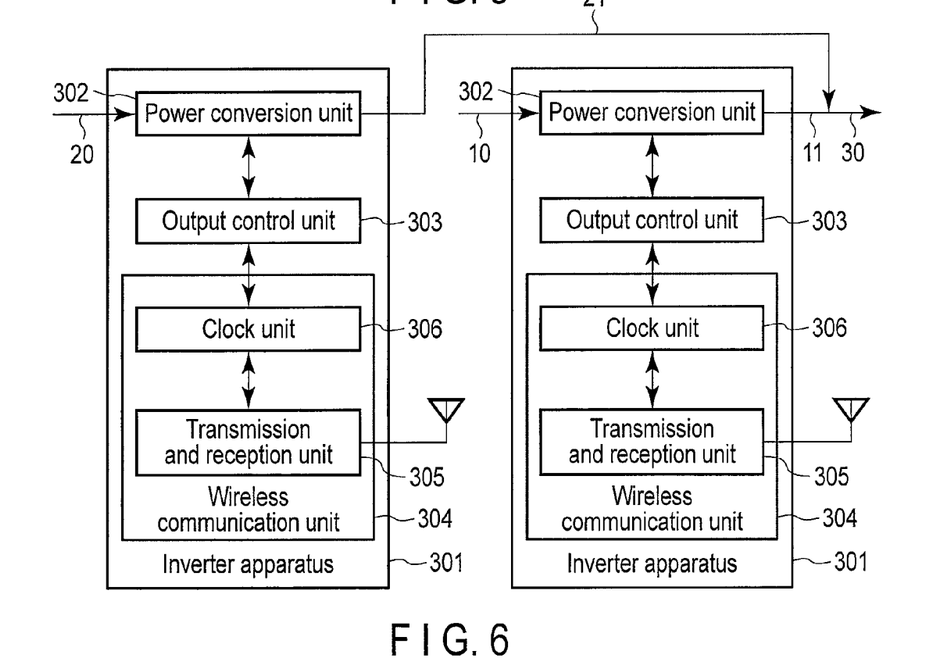
FIG. 6 is a diagram illustrating an inverter system including a plurality of inverter apparatuses according to a third embodiment.

As illustrated in FIG. 6, the inverter system can be formed by connecting a plurality of the inverter apparatuses 301 together in parallel. The inverter system in FIG. 6 may further comprise another inverter apparatus not shown in the drawings. Furthermore, the inverter system can be formed by connecting one or more inverter apparatuses 301 in parallel with one or more inverter apparatuses 101 according to the first embodiment. In FIG. 6, an inverter apparatus 301 generates output power 11 based on the input power 10, whereas another inverter apparatus 301 generates output power 21 based on the input power 20. The output power 11 and the output power 21 are superposed on each other to generate output power 30 from the inverter system in FIG. 6. Here, the inverter apparatuses 301 correct the phase of the output power 11 and the phase of the output power 21, respectively, based on the measured time from the clock unit 306. The inverter apparatuses 301 further use the synchronization signal to notify one another of the measured time from the clock unit 306. Each of the inverter apparatuses 301 corrects the measured time from the clock unit 306 in accordance with the common algorithm, using the received synchronization signal. Hence, the phase of the output power 11 and the phase of the output power 21 substantially match. Consequently, a possible power loss is suppressed when the output power 11 and the output power 21 are superposed on each other.

As described above, the inverter apparatus according to the third embodiment wirelessly transmits the synchronization signal based on the measured time from the clock unit, to the other inverter apparatus. The synchronization signal is used for phase correction by the other inverter apparatus. Furthermore, the inverter apparatus according to the present embodiment wirelessly receives the synchronization signal from the other inverter apparatus and corrects the phase of the output power based on the synchronization signal in accordance with the common algorithm. Thus, according to the inverter apparatus of the present embodiment, the phases of the output power from the inverter apparatuses are synchronized when the inverter system is formed. This suppresses a possible loss in the output power from the inverter system.

The processing in the above-described embodiments can be implemented using a general-purpose computer as basic hardware. A program implementing the processing in each of the above-described embodiments may be stored in a computer readable storage medium for provision. The program is stored in the storage medium as a file in an installable or executable format. The storage medium is a magnetic disk, an optical disc (CD-ROM, CD-R, DVD, or the like), a magnetooptic disc (MO or the like), a semiconductor memory, or the like. That is, the storage medium may be in any format provided that a program can be stored in the storage medium and that a computer can read the program from the storage medium. Furthermore, the program implementing the processing in each of the above-described embodiments may be stored on a computer (server) connected to a network such as the Internet so as to be downloaded into a computer (client) via the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An inverter apparatus comprising:
   a power conversion unit which converts input power that is one of DC power and AC power into AC output power;
   a wireless communication unit which wirelessly receives a first synchronization signal;
   a control unit which controls a phase of the output power based on the first synchronization signal; and
   a clock unit which obtains a measured time;
   wherein:
   the first synchronization signal contains time information,
   the wireless communication unit generates a time correction signal based on the time information,
   the clock unit corrects the measured time based on the time correction signal, and
   the control unit matches the phase of the output power with a phase dependent on the measured time.

2. The apparatus according to claim 1, wherein the clock unit matches the measured time with a time indicated by the time correction signal.

3. The apparatus according to claim 1, wherein the control unit derives a reference phase based on the measured time and a frequency of the output power and controls the phase of the output power based on the reference phase.

4. The apparatus according to claim 1, wherein the control unit controls the phase of the output power based on a time obtained by adding an offset to the measured time.

5. The apparatus according to claim 1, wherein the clock unit corrects the measured time based on a time obtained by adding an offset to a time indicated by the time correction signal.

6. The apparatus according to claim 1, wherein the wireless communication unit generates a second synchronization signal based on the measured time and wirelessly transmits the second synchronization signal.

7. The apparatus according to claim 6, wherein the second synchronization signal contains a timestamp indicative of the measured time.

8. The apparatus according to claim 6, wherein when a time indicated by the time correction signal is earlier than the measured time, the clock unit matches the measured time with the time indicated by the time correction signal.

9. The apparatus according to claim 6, wherein the control unit controls the phase of the output power based on a time obtained by subtracting an offset from the measured time.

10. The apparatus according to claim 6, wherein the wireless communication unit generates the second synchronization signal based on a time obtained by adding an offset to the measured time.

11. An inverter apparatus comprising:
a power conversion unit which converts input power that is one of DC power and AC power into AC output power;
a wireless communication unit which wirelessly receives a first synchronization signal; and
a control unit which controls a phase of the output power based on the first synchronization signal;
wherein:
the first synchronization signal is repeatedly transmitted at known transmission intervals,
the wireless communication unit notifies the control unit that the first synchronization signal has been received, and
when the control unit is notified that the first synchronization signal has been received, the control unit controls the phase of the output power based on the known transmission interval.

12. An inverter apparatus comprising:
a power conversion unit which converts input power that is one of DC power and AC power into AC output power;
a clock unit which obtains a measured time;
a wireless communication unit which generates a synchronization signal based on the measured time and wirelessly transmits the synchronization signal; and
a control unit which matches a phase of the output power with a phase dependent on the measured time.

13. An inverter system comprising:
a first inverter apparatus and a second inverter apparatus connected together in parallel,
wherein the first inverter apparatus comprises:
a power conversion unit which converts first input power that is one of DC power and AC power into first AC output power;
a wireless communication unit which wirelessly receives a synchronization signal;
a control unit which controls a phase of the first output power based on the synchronization signal; and
a clock unit which obtains a measured time; and
wherein:
the first synchronization signal contains time information,
the wireless communication unit generates a time correction signal based on the time information,
the clock unit corrects the measured time based on the time correction signal,
the control unit matches the phase of the output power with a phase dependent on the measured time,
the second inverter apparatus converts second input power that is one of DC power and AC power into second AC output power, and
the first output power and the second output power are superposed on each other to generate final output power.

* * * * *